United States Patent
Hayashi et al.

(10) Patent No.: US 7,062,999 B2
(45) Date of Patent: Jun. 20, 2006

(54) INVERTED VERTICAL LATHE

(75) Inventors: Noriyasu Hayashi, Niwa gun (JP); Yukiyasu Tanaka, Niwa gun (JP); Masashi Isaji, Niwa gun (JP); Yukio Morita, Niwa gun (JP); Haruhiko Koike, Niwa gun (JP); Kazuki Uemura, Niwa gun (JP)

(73) Assignee: Yamazaki Mazak Corporation, Aich Pref. (JP)

( * ) Notice: Subject to any disclaimer, the term of this patent is extended or adjusted under 35 U.S.C. 154(b) by 0 days.

(21) Appl. No.: 10/865,016

(22) Filed: Jun. 10, 2004

(65) Prior Publication Data

US 2004/0250666 A1 Dec. 16, 2004

(30) Foreign Application Priority Data

Jun. 16, 2003 (JP) ............................. 2003-170338

(51) Int. Cl.
B23B 7/06 (2006.01)

(52) U.S. Cl. .......................................... 82/122; 82/124

(58) Field of Classification Search ................. 82/122, 82/124, 138, 149, 120, 121; 29/563, 35.5, 29/39, 40
See application file for complete search history.

(56) References Cited

U.S. PATENT DOCUMENTS 4,414,871 A * 11/1983 Trout ........................... 82/165
4,608,747 A * 9/1986 Link et al. .................... 483/14
5,152,166 A 10/1992 Brock et al. .................. 73/37.9
6,021,695 A 2/2000 Kosho et al. .................. 82/122
6,055,892 A * 5/2000 Otake ........................... 82/124
6,243,019 B1 * 6/2001 Berns ....................... 340/686.5

FOREIGN PATENT DOCUMENTS

| JP | 60 099543 | 6/1985 |
| JP | 06 106437 | 4/1994 |
| JP | 09-123005 | 5/1997 |

OTHER PUBLICATIONS

European Search Report regarding Application No. 04013604.6 dated Jul. 20, 2004.

* cited by examiner

*Primary Examiner*—Willmon Fridie, Jr.
(74) *Attorney, Agent, or Firm*—Renner, Otto, Boisselle and Sklar, LLP

(57) ABSTRACT

The object of the invention is to provide an inverted vertical lathe comprising a device for replacing collets automatically, and having a detector for detecting that the collet has been gripped correctly. A chuck 400 mounted on a headstock 40 grips a collet 500 in a replaceable manner via a tapered bore 430 provided to the end thereof. A collet end face eccentricity detector 600 comprises a detecting member (sensor) 610 fixed to the end of an arm 630. The detecting member 610 detects the eccentricity of the end face 510 of the collet 500 in a contactless manner. A variation pattern of the eccentricity occurring when each collet 500 is gripped correctly by the chuck 400 on the main spindle is detected in advance, and this pattern is compared with the variation pattern of the eccentricity detected by the present detection, and thus, whether or not the collet has been gripped correctly is detected.

2 Claims, 5 Drawing Sheets ns priority from Japanese patent application 2003-170338 filed on Jun. 16, 2003, the content of which is hereby incorporated by reference into this application.

1. Field of the Invention

The present invention relates to an inverted vertical lathe equipped with an automatic replacement device for replacing a collet chuck.

2. Description of the Related Art

An inverted vertical lathe is a lathe for providing a turning process to a work gripped downward with respect to a main spindle disposed in the perpendicular direction, which is suitable for processing a large amount of work lots with high efficiency since the chips generated during the process can be treated easily.

As for the collet chuck to be mounted to the main spindle of the lathe for gripping the work, it is possible to prepare dedicated collet chucks corresponding to various works in addition to a general-purpose collet chuck.

For example, patent document 1 discloses a device preparing a plurality of auxiliary collets corresponding to the main collet, and replacing only the auxiliary collets in response to the change in setup.

Patent Document 1

Japanese Patent Application Laid-Open No. 9-123005

SUMMARY OF THE INVENTION

The present invention aims at providing an inverted vertical lathe having a device for automatically replacing the collet on the chuck, utilizing the structural characteristic of the inverted vertical lathe that the chuck on the main spindle is disposed downward.

The inverted vertical lathe according to the present invention comprises a headstock equipped with a main spindle disposed perpendicularly and having a chuck disposed at a lower side thereof, and a tool post disposed below the main spindle, wherein the inverted vertical lathe has a collet replacement position located within a range of movement of the main spindle, and a device for transferring a collet to the replacement position. Moreover, the collet is gripped by the chuck on the main spindle in a replaceable manner.

Furthermore, the lathe comprises a detector for detecting the eccentricity of an end face of the collet in a contactless manner by rotating the main spindle at low speed after replacing the collet, and the detector is equipped with a means for confirming whether the collet is gripped correctly or not by comparing an eccentricity pattern of the end face of the collet when the collet is gripped correctly by the chuck and an eccentricity pattern newly detected by the detector.

DETAILED DESCRIPTION OF THE PREFERRED EMBODIMENT

Figure 1:
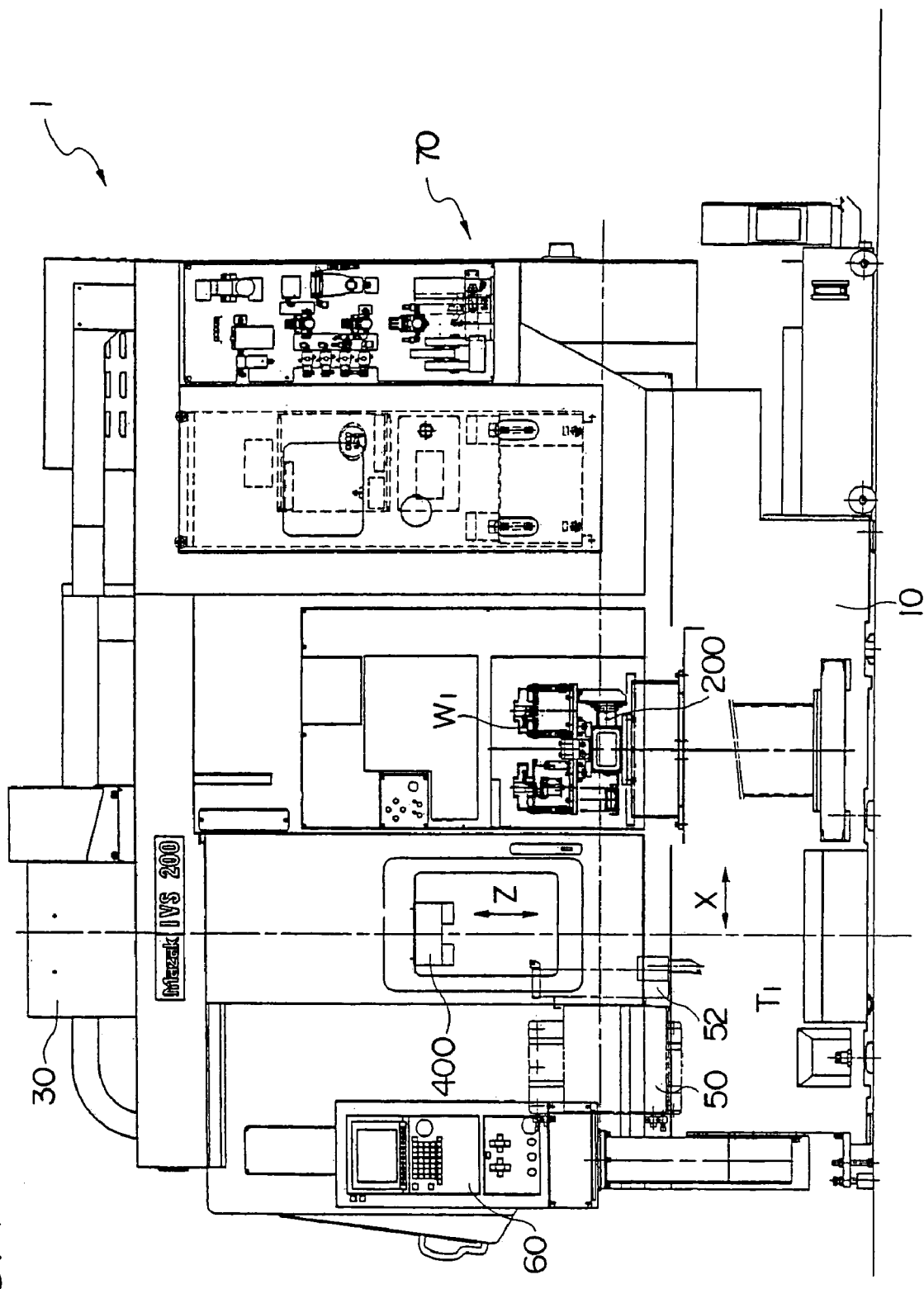
FIG. 1 is a front view of the inverted vertical lathe according to the present invention.
Figure 2:
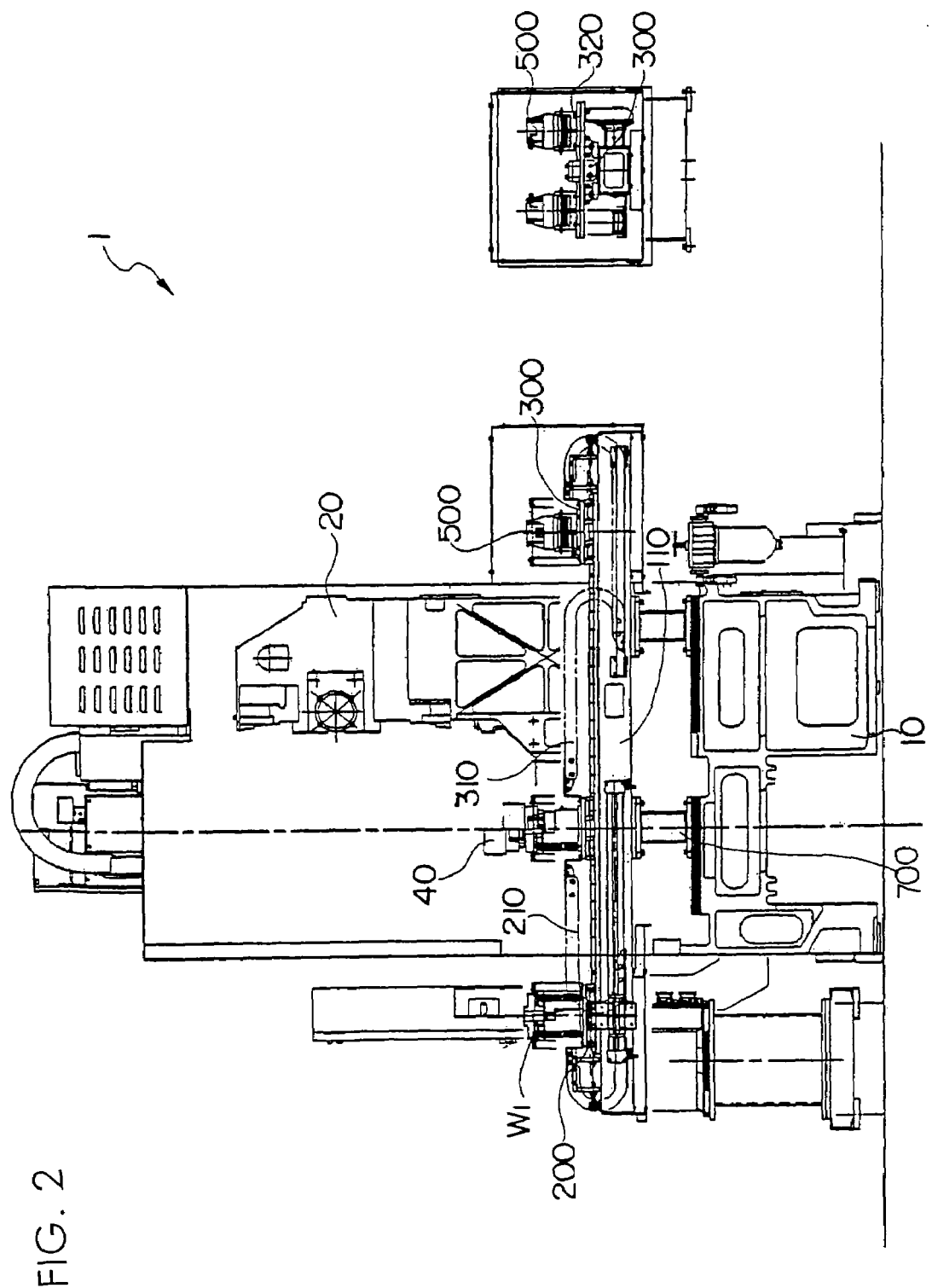
FIG. 2 is a right side view of the inverted vertical lathe according to the present invention.
Figure 3:
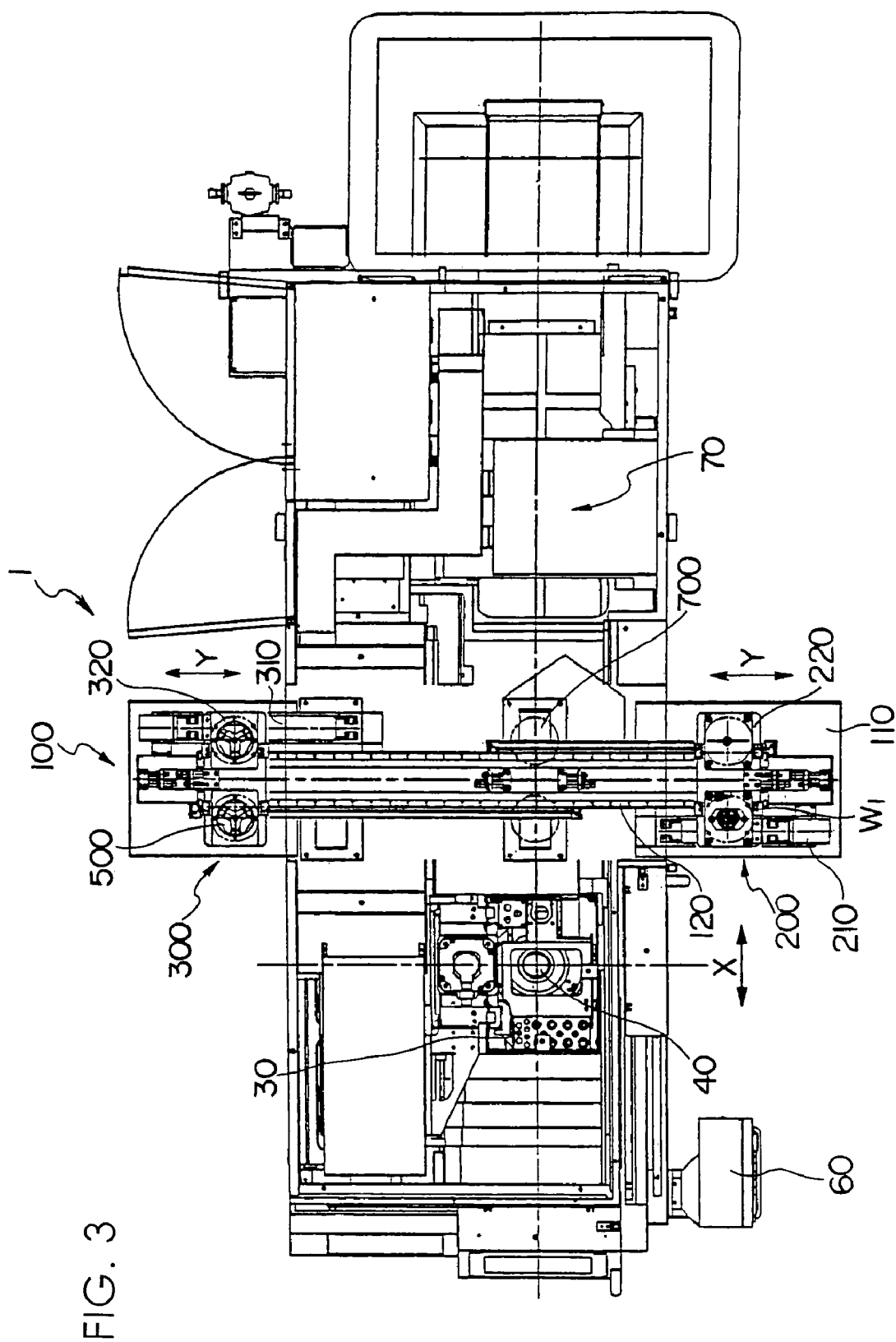
FIG. 3 is a plan view of the inverted vertical lathe according to the present invention.

FIG. 1 is a front view of an inverted vertical lathe according to the present invention, FIG. 2 is a right side view thereof, and FIG. 3 is a plan view thereof.

The inverted vertical lathe, the entire body of which is designated by reference number 1, is equipped with a base 10, a frame 20 standing on the base 10, and a headstock 30 disposed above the frame 20 and capable of moving in the directions of axis X and axis Z. The headstock 30 is equipped with a main spindle 40, which grips a work and is rotatably driven.

The frame 20 is equipped with a tool post 50. The tool post 50 has a turret 52 mounting a plurality of turning tools $T_1$.

A control panel 60 is provided to the front side of the inverted vertical lathe 1 for controlling various devices.

The inverted vertical lathe 1 is also equipped with other necessary devices 70.

The inverted vertical lathe 1 according to the present invention 1 further comprises a shuttle conveyor 100 for transferring works and collets.

The shuttle conveyor 100 has rails 120 disposed on a base 110, and on the rails 120 are provided a work shuttle conveyor 200 and a collet shuttle conveyor 300, which are capable of reciprocating in the direction of axis Y.

The work shuttle conveyor 200 comprises a support base 220 for mounting the work W1, and moves from a setup position to a replacement position 700 in the interior of the inverted vertical lathe while accompanying a cable 210.

The collet shuttle conveyor 300 comprises a support base 320 for mounting a collet 500, and moves from a setup position to the replacement position 700 in the interior of the inverted vertical lathe while accompanying a cable 310.

Figure 4:
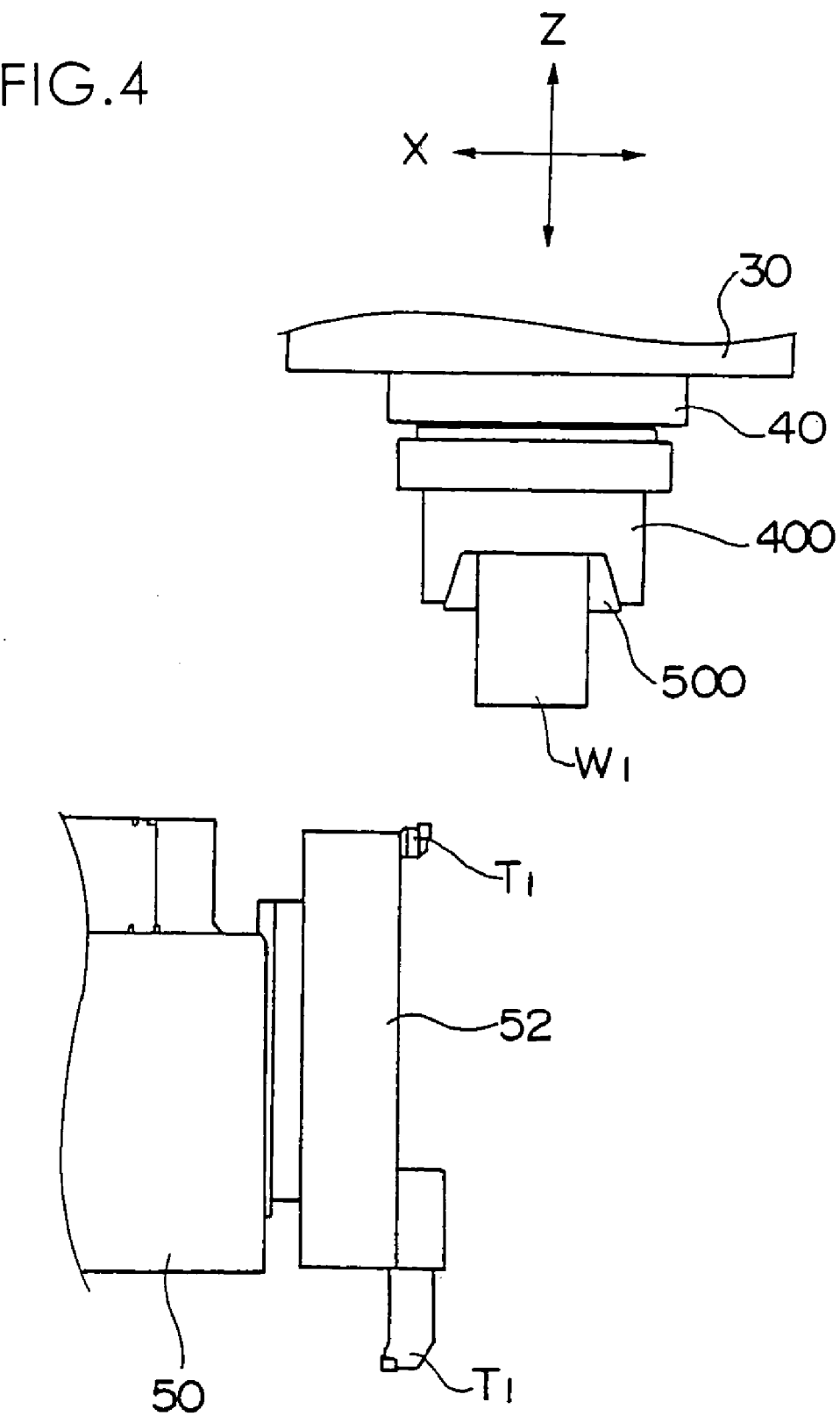
FIG. 4 is a detailed view showing the processing position of the inverted vertical lathe.

FIG. 4 is an explanatory view showing the details of the turning process position of the inverted vertical lathe 1 according to the present invention.

The headstock 30 supports the main spindle 40 in a rotatable manner, and the main spindle 40 is driven along axis X and axis Z.

The main spindle 40 is equipped with a chuck 400, and a collet 500 is mounted to the chuck 400 in a replaceable manner. Since various types of collets 500 can be mounted in a replaceable manner, the device is capable of gripping various types of works $W_1$ and subjecting the same to the turning process.

The tool post 50 is equipped with a revolving turret 52, the turret 52 having a plurality of cutting tools T1 mounted thereto.

The work shuttle conveyor disposed to the shuttle conveyor 100 transfers a material work $W_1$ to the replacement position 700, where the processed work $W_1$ is received and the material work $W_1$ is supplied to the collet 500 on the main spindle.

The collet shuttle conveyor transfers a collet 500 to be used in a subsequent process to the replacement position 700, where a used collet 500 is received from the chuck 400 and the new collet 500 is mounted to the chuck 400.

The headstock 30 and main spindle 40 can move in the direction of axis X, reciprocating between the processing position and the replacement position of the work and collet.

According to the inverted vertical lathe 1 of the present invention, the collet 500 can be replaced automatically with respect to the chuck 400 on the main spindle. However, it is indispensable to confirm that the automatically replaced collet is mounted correctly in order to grip the work accurately and to process the same.

Therefore, the inverted vertical lathe of the present invention is equipped with a device for automatically detecting the end face of the collet gripped by the chuck on the main spindle. This device has a function to detect the eccentricity of the end face of the rotating collet and to determine whether the collet has been gripped correctly.

Figure 5:
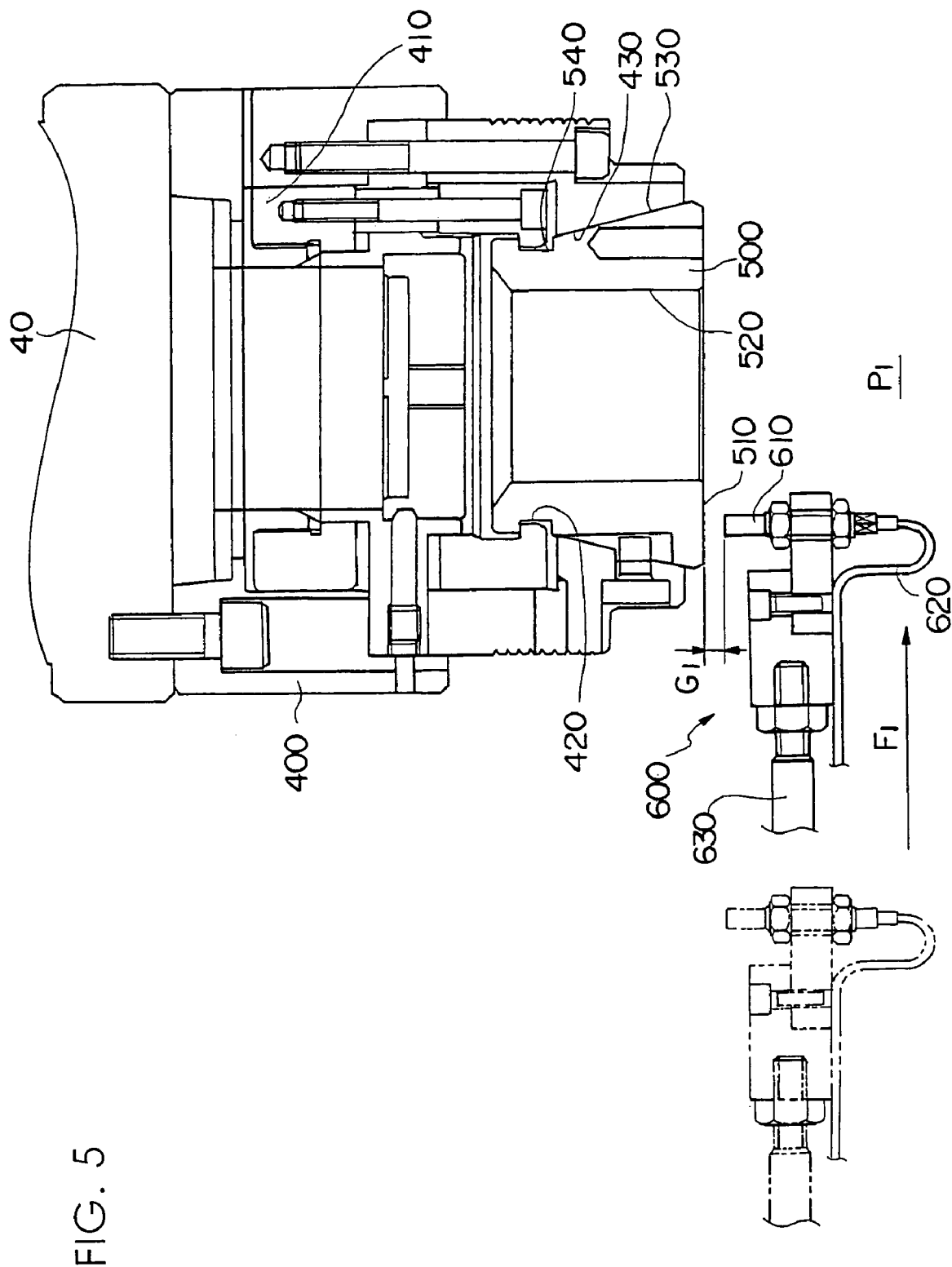
FIG. 5 is a detailed view of the end face of the collet.

FIG. 5 is an explanatory view showing the details of the tip portion of the collet gripped by the chuck.

The chuck 400 mounted to the headstock 40 grips the collet 500 in a replaceable manner via a tapered bore 430 provided to the tip portion thereof.

The chuck 400 comprises a piston 410 operated via fluid pressure, and a claw 420 driven by the piston 410 engages in an annular groove 540 provided to the collet 500 and moves the collet 500 in the vertical direction.

When the collet 500 is pulled upward, a tapered surface 530 formed to the outer side of the collet 500 slides against the tapered bore 430 of the chuck 400, by which the diameter of an internal bore 520 of the segmented collet 500 is reduced.

Through this action, the work inserted to the internal bore 520 is gripped.

The main spindle 40 moves to the collet end face detecting position, and the replaced collet is subjected to detection for detecting the eccentricity of the end face 510 of the collet.

An eccentricity detector of the collet end face, the whole of which being denoted by reference number 600, includes a detecting member (sensor) 610 mounted to the front end of an arm 630. The detecting member 610 detects the eccentricity of the end face 510 of the collet 500 in a contactless manner, and sends the detected data via a line 620 to a control unit.

At the collet end face detecting position $P_1$, the arm 630 of the collet end face detector 600 moves in the direction shown by arrow $F_1$, transferring the detecting member 610 to a position confronting the end face 510 of the collet 500.

The detecting member 610 is positioned so that it is separated by a gap $G_1$ from the end face 510 of the collet 500.

The gap $G_1$ is determined according to the specification of the detecting member (sensor) 610, and can be set to approximately 1 mm, for example.

In this state, the main spindle 40 is rotated at low speed, and the variation of the gap between the collet end face 510 and the detecting member 610 is detected as eccentricity.

The variation of eccentricity of the collet end face can be used to detect whether the collet is gripped correctly or not by comparing the absolute value being detected with the preset value. However, it is also possible to detect in advance the variation pattern of the eccentricity that occurs when each collet 500 is gripped correctly by the chuck 400 on the main spindle, and by comparing that value with the variation pattern of the eccentricity detected by the present detection, detect whether or not the collet is gripped correctly.

According to the present invention, when the collect is replaced automatically, whether the collet is gripped correctly or not is confirmed by the following steps.

Step 1: A cutting process, process 1, is completed in the interior of the inverted vertical lathe machine.

Step 2: After the work shuttle conveyor moves into the machine, the main spindle moves to a position above the work shuttle conveyor and returns the product having completed the cutting process 1 to the conveyor.

Step 3: The work shuttle conveyor moves to the exterior of the machine. At the same time, the collet shuttle conveyor moves into the machine.

Step 4: The collet used for process 1 is returned to the collet shuttle conveyor.

Step 5: The main spindle returns into the machine, and chips on the collet grip portion are cleaned by coolant and air.

Step 6: The main spindle returns to a position above the collet shuttle conveyor and automatically grips a collet to be used for process 2.

Step 7: The end face eccentricity detector is sent into the range of movement of the spindle.

Step 8: The main spindle moves to the detecting position, and the eccentricity detector detects the collet end face to confirm that the collet is gripped correctly.

Step 9: The collet shuttle conveyor moves to the exterior of the machine, and the work shuttle conveyor mounting thereon a work material to be subjected to process 2 moves into the machine.

Step 10: The collet chuck grips the material to be subjected to process 2, moves into the machine and starts the process.

When it is determined in step 8 that the gripping is defective, steps 4 through 8 are retried.

As explained, the inverted vertical lathe according to the present invention is equipped with a device for automatically replacing the collets, so it is capable of processing various types of works. The present inverted vertical lathe is also equipped with a device for detecting that the replaced chuck is gripped correctly by the chuck, so it is capable of effectively preventing the occurrence of process defects.

What is claimed is:

1. An inverted vertical lathe comprising:
   a headstock equipped with a main spindle disposed perpendicularly and supported with the headstock in a rotatable manner;
   a chuck disposed at a lower side of the headstock,
   a tool post disposed below the main spindle;
   a collet replacement position located within a range of movement of the main spindle;
   a device for transferring a collet to the replacement position; and
   a detector for detecting an eccentricity of an end face of the collet in a contactless manner by rotating the main spindle at low speed after replacing the collet;
   wherein the chuck on the main spindle is disposed downward, and the collet is gripped by the chuck on the main spindle in a replaceable manner.

2. The inverted vertical lathe according to claim 1, wherein the detector is equipped with a means for confirming whether the collet is gripped correctly or not by comparing an eccentricity pattern of the end face of the collet when the collet is gripped correctly by the chuck and an eccentricity pattern newly detected by the detector.

* * * * *